Figure 1:
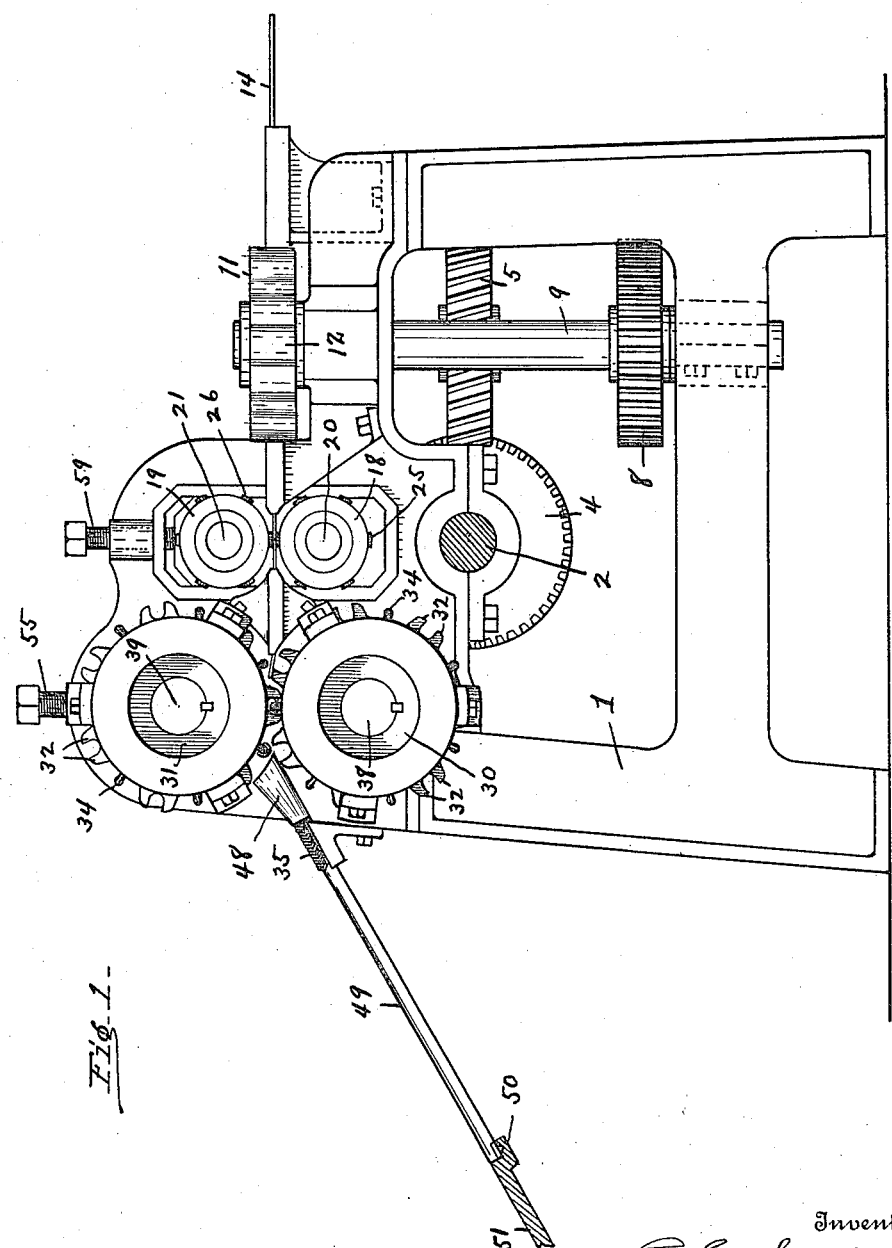

C. E. SAFFORD.
MACHINE FOR MAKING WIRE STAPLES.
APPLICATION FILED OCT. 30, 1911.

1,170,676.

Patented Feb. 8, 1916.
6 SHEETS—SHEET 1.

Witnesses
J. H. Perrault
J. Otto Baenziger

Inventor
C. E. Safford
By E. S. Wheeler
Attorney

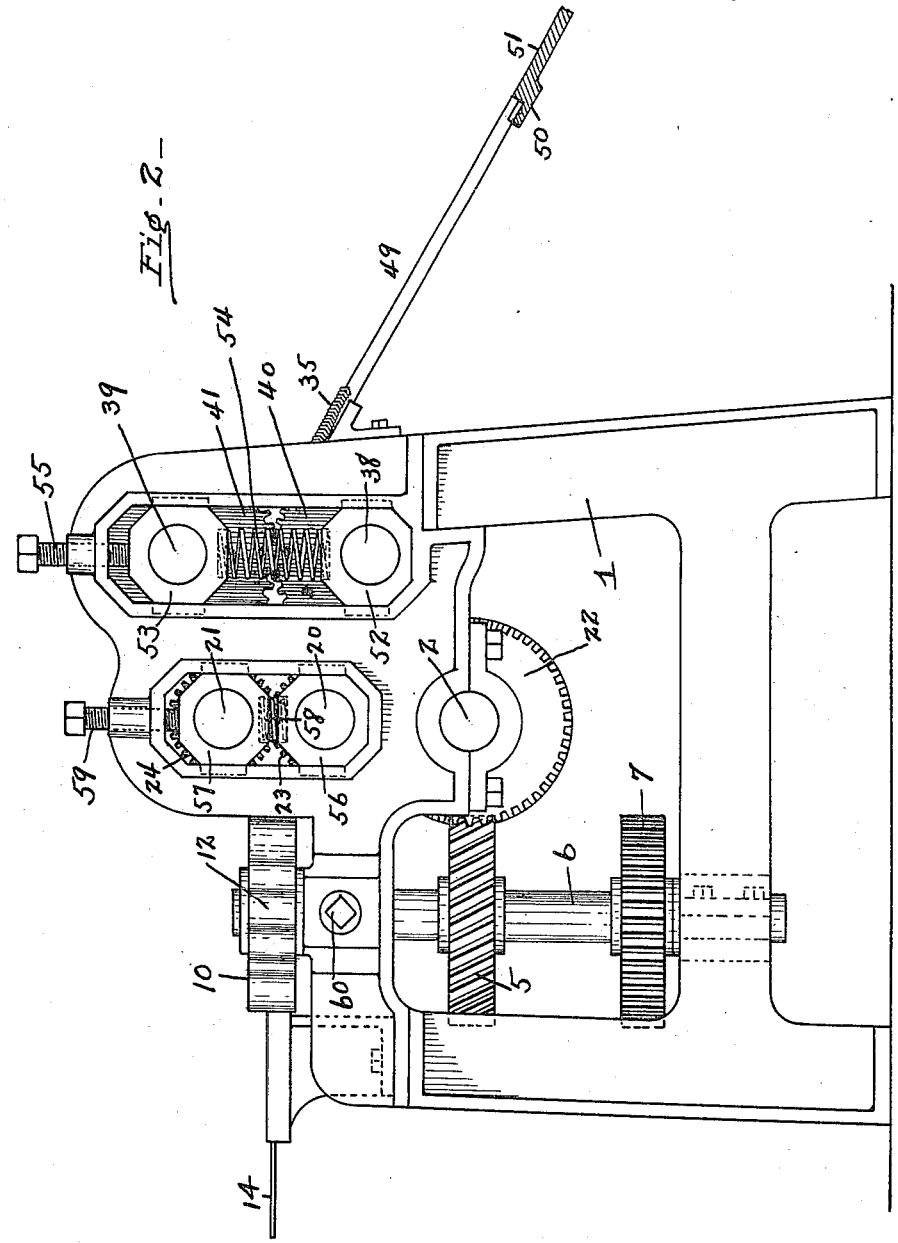

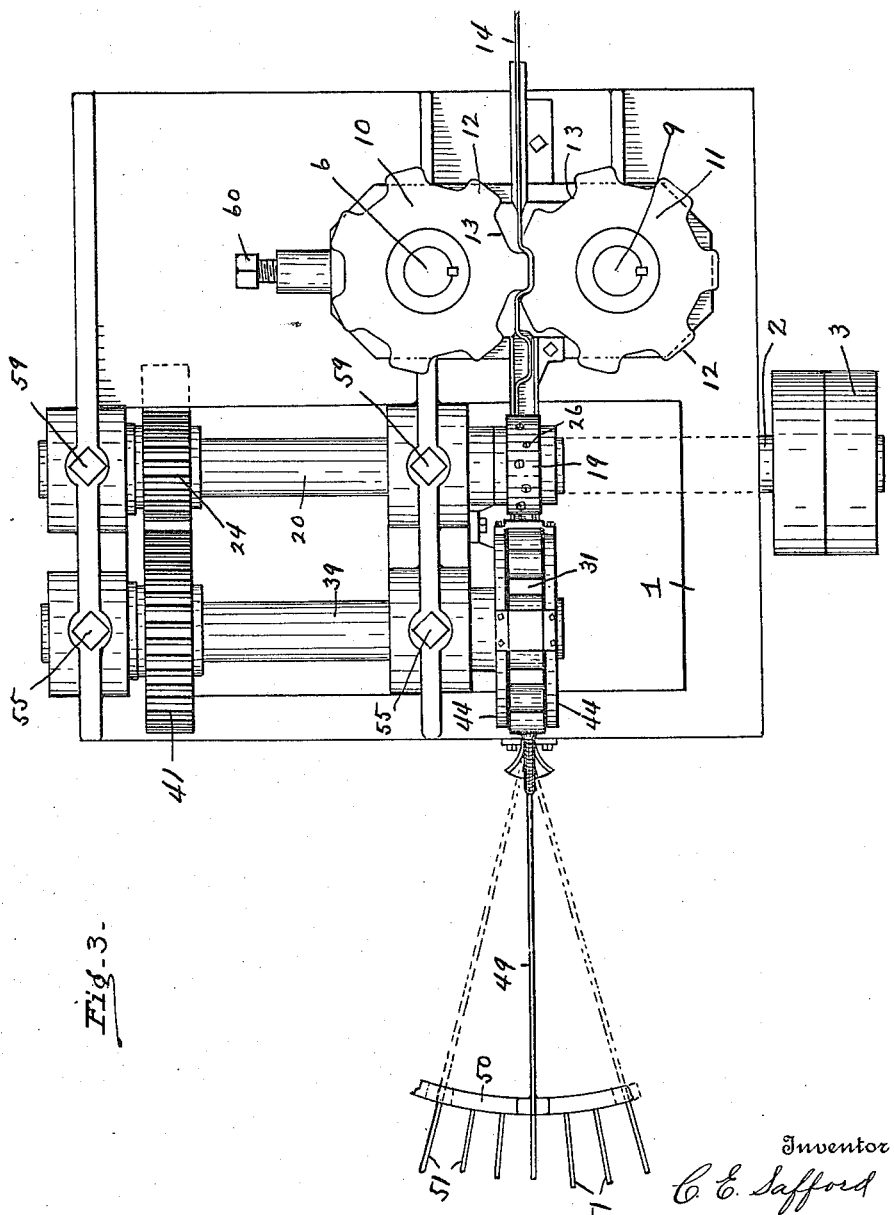

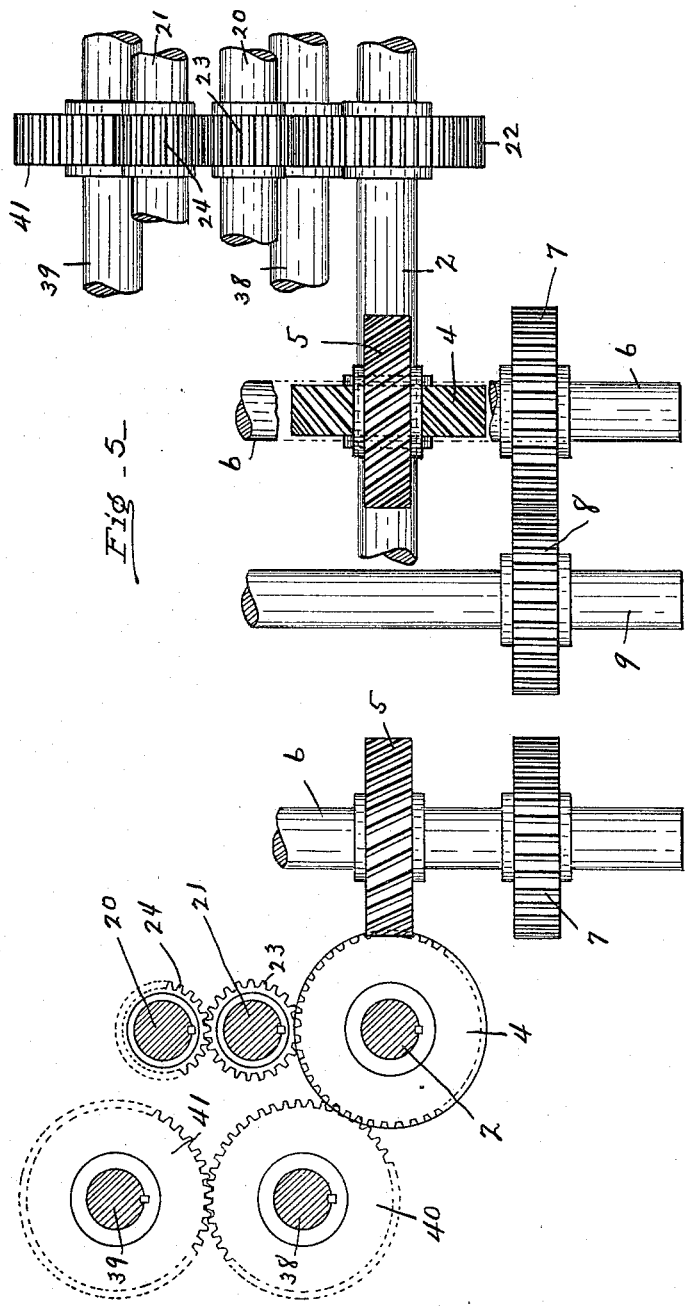

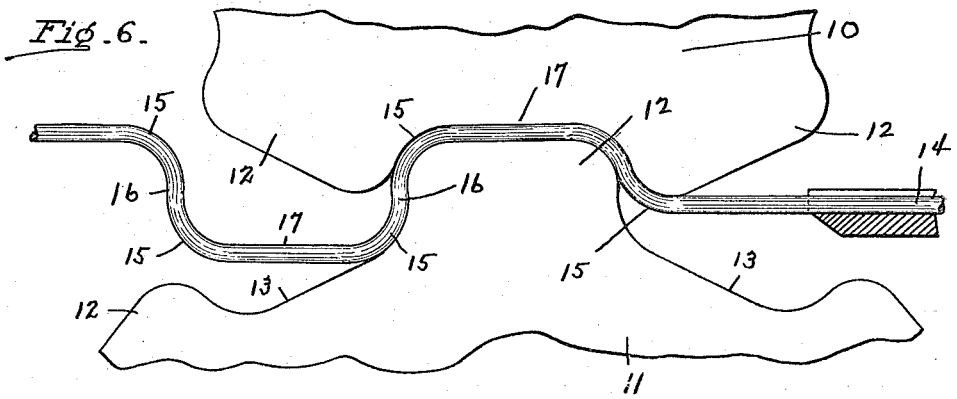
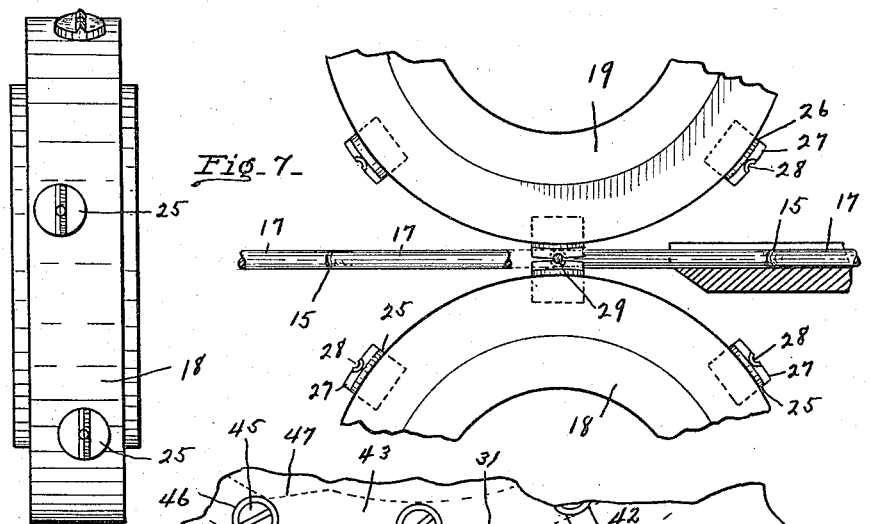
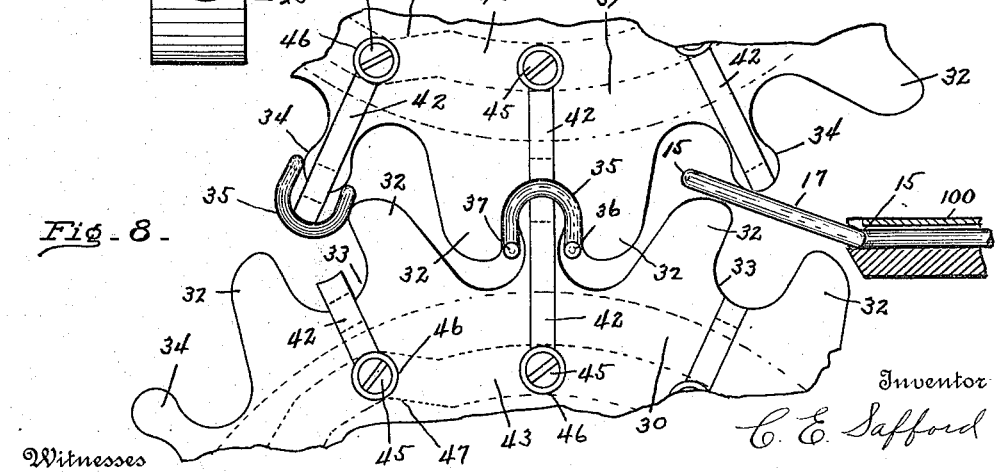

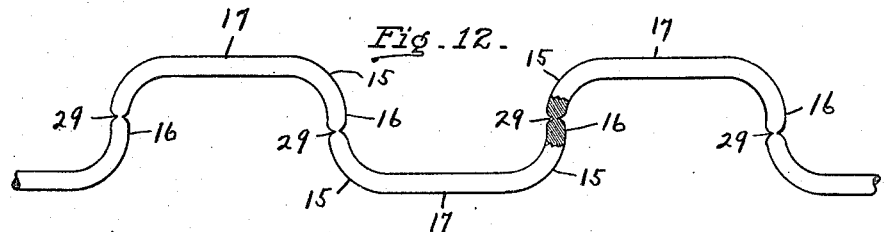
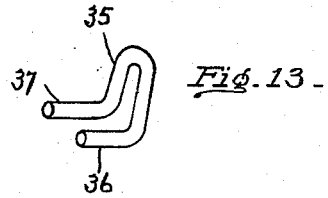
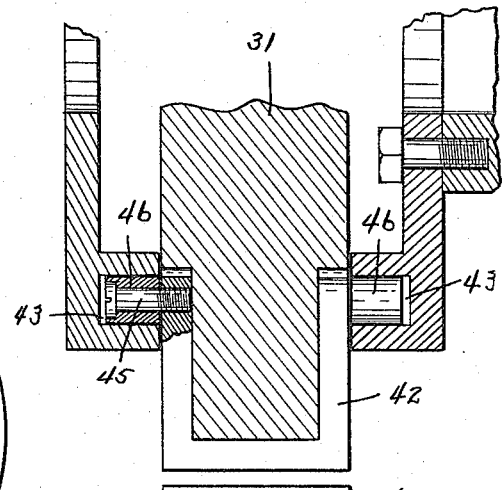
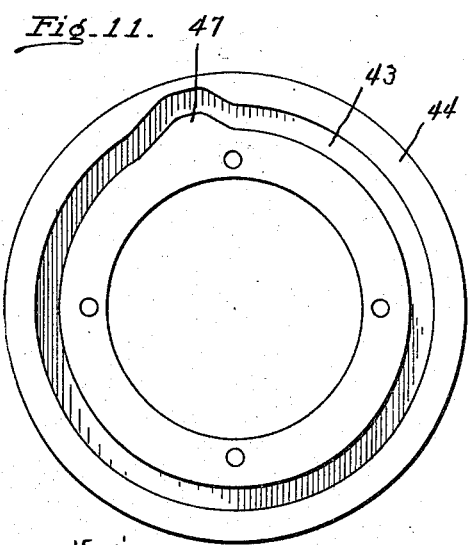
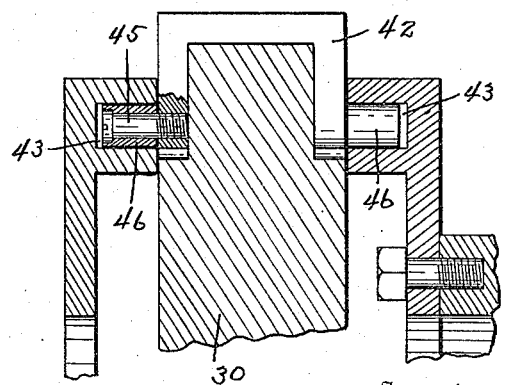
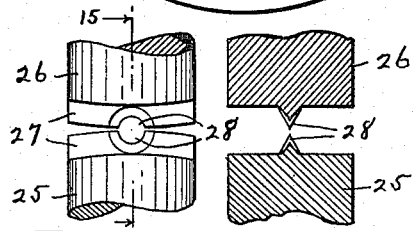

UNITED STATES PATENT OFFICE.

CLARENCE E. SAFFORD, OF DETROIT, MICHIGAN.

MACHINE FOR MAKING WIRE STAPLES.

1,170,676.  Specification of Letters Patent.  Patented Feb. 8, 1916.

Application filed October 30, 1911. Serial No. 657,483.

*To all whom it may concern:*

Be it known that I, CLARENCE E. SAFFORD, a citizen of the United States, residing at Detroit, in the county of Wayne, State of Michigan, have invented certain new and useful Improvements in Machines for Making Wire Staples; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to machines for making wire staples for use in tying together the crossed strands of a wire fabric or fencing, and the invention consists in the construction and arrangement of parts more fully set forth and pointed out particularly in the claims.

The object of the invention is to provide simple and efficient means for quickly manufacturing wire staples of a peculiar shape and automatically delivering them onto a track from which they may be distributed to a plurality of guides leading into a wire fabric machine.

The invention contemplates the employment of instrumentalities through the operation of which the wire strand from which the staples are formed is carried through coöperating rotatable members between whose faces the wire is bent, cut, and shaped into the form of staples desired. The above object is attained by the mechanism illustrated in the accompanying drawings, in which:—

Figure 1 is a side elevation of a machine embodying my invention, the main driving shaft appearing in transverse section. Fig. 2 is a side elevation opposite to that shown in Fig. 1. Fig. 3 is a plan view of the machine. Fig. 4 is a fragmentary view in section showing the train of gearing employed in driving the several operative parts of the machine, one of the vertical shafts and its gear being omitted. Fig. 5 is a fragmentary view in elevation of said train of gearing, the vertical shaft omitted from Fig. 4 being in place. Fig. 6 is an enlarged fragmentary view of a portion of the horizontally disposed disks between whose faces the strand wire is formed into a series of opposed transverse bends. Fig. 7 is a fragmentary view in elevation of the cutting disks between whose faces the bent stay is partially severed. Fig. 8 is a fragmentary view in elevation of the vertically disposed staple forming disks, having in their peripheries coöperating forming members which give the final form to the staples. Fig. 9 is an elevation of one of the disks in whose peripheries are set the cutting disks which partially sever the strand from which the staples are formed. Fig. 10 is an enlarged fragmentary view in section through a portion of the peripheries of the staple forming disks showing the yokes which discharge the staples from the forming members of said disks. Fig. 11 is an elevation of a cam ring showing therein one of the cam ways which actuate said discharging yokes. Fig. 12 is a plan view of the strand from which the staples are formed, showing the transverse bends therein and the strand partially severed between said bends. Fig. 13 is a perspective view of one of the formed staples. Fig. 14 is an elevation of the dies between which the strand is partially severed. Fig. 15 is a sectional view as on line 15—15 of Fig. 14.

Referring to the characters of reference, 1 designates the frame of the machine in which is journaled the main driving shaft 2, having on the end thereof a driving pulley 3 adapted to be driven from any suitable source of power. Upon shaft 2 is a spiral gear 4 which meshes with a like gear 5 on the vertical shaft 6. Upon said shaft 6, below the spiral gear thereon, is a spur gear 7 which meshes with a like gear 8 on a vertical shaft 9, said shafts 6 and 9 being disposed in parallelism and being connected by the gears 7 and 8 are caused to turn in unison in opposite directions. Upon the upper ends of the shafts 6 and 9 are the bending disks 10 and 11 respectively. These disks are disposed horizontally and their peripheries are provided with alternating teeth 12 and depressions 13. The teeth of one disk are adapted to enter the depressions in the other disk as said disks revolve, so that the strand 14, from which the staples are formed and which is fed between said disks, is provided with a series of lateral bends 15 connected by transverse portions 17, as clearly shown in Fig. 6, the alternate straight longitudinal portion of the bent strand being offset, as clearly shown in Fig. 12.

From the bending disks the bent strand passes to the cutting disks 18 and 19 respectively, which are disposed in vertical alinement, and are mounted upon the horizontal shafts 20 and 21 respectively. Shafts 20 and 21 are suitably journaled in the frame and are driven from a gear 22 on the main shaft 2 which meshes with a gear 23 on shaft 20. On the shaft 21 is a gear 24 which meshes with the gear 23. By this arrangement the shafts 20 and 21 are driven so as to revolve in opposite directions in unison. Set in the peripheries of the cutting disks are projecting dies 25 and 26 respectively, having coöperating cutting members 27, which, as the cutting disks revolve, are successively brought into operative relation in pairs to act upon the bent strand which passes between the faces thereof. Centrally disposed with respect to each of the cutting members 27 of said dies is a curved cutting edge 28, which, as the cutting members of a pair of dies are brought into operative relation by rotation of the cutting disks, operate to partially sever the strand near the center of each of the transverse portions 16 thereof, as clearly shown at 29. The bent strand is so fed to the cutting dies that each of the transverse portions 16 therein will extend across the faces of the cutting disks and lie between the cutting members 27 of the dies therein so that the partial severing will occur at the transverse portion thereof as said dies come together. It will be noted on referring to Fig. 9 that the dies are arranged staggeringly in the peripheries of the cutting disks, the purpose of which is to cause them to so cut the bent strand as to leave the staples when formed with one leg thereof longer than the other, as clearly shown in Fig. 13, to give a greater length to the leg of the staple which crosses the strand wire of the fabric farthest from the stay wire when said staple is formed into a tie to join together the crossed strands of a wire fabric, as will be well understood in the art.

From the cutting disks the bent and partially severed strand passes to the staple forming disks 30 and 31 by which the staples are successively seized and broken from the remaining strand and between whose faces the operation of forming the staples is completed. The shape of the staple forming members on the peripheries of said disks can better be understood by reference to Fig. 8, wherein it will be seen that each of the staple forming disks is provided on its periphery with a plurality of projecting jaw members 32, between which is a curved recess 33 adapted to receive the loop of the staple as it is being formed, and with interposed shaping members 34 adapted to enter the recess in the opposed disk to carry the staples thereinto and give the required shape thereto. These jaws and shaping members are adapted to mesh together somewhat in the form of gear teeth as the disks revolve, the arrangement being such that a staple 35 is formed between each succeeding pair of jaws in the opposed disks by the shaping members which enter between them as the disks roll together.

As the bent and partially severed strand enters between the staple forming disks the action of the shaping members, which force the loop of the staple into the recess between the jaws, will place such a strain upon the strand at the points where it is partially severed as to cause the bent portions from which the staples are formed to separate. The trough in which the strand slides from the cutting to the final bending mechanism is covered for the most part as indicated at 100 in Fig. 8, and it will be understood that the staples, as they are successively seized by the members 32—34, are bent about the end of the trough and snapped from the remaining strip. Because of the fact that each bend or loop in the strand which forms a staple is provided with laterally extending terminals each staple, when forced into the recess between the jaws by the shaping members, will comprise a loop portion and legs whose terminals 36 and 37 project from the loop portion at an angle thereto, as clearly shown in Fig. 13. The staple forming disks are mounted upon the shafts 38 and 39 respectively, which are journaled in the frame in parallelism, and which are driven through the medium of a gear 40 on shaft 38 which meshes with the gear 22 on shaft 2, and with a gear 41 on shaft 39, as shown in Fig. 4, an arrangement which causes the shafts 38 and 39 to rotate in opposite directions at the same rate of speed.

To provide for discharging the staples from the shaping members 34 and from between the jaws 32 after they have been formed, there are employed a plurality of yokes 42 which embrace the peripheries of the staple forming disks, one set of yokes lying within the recess 33, and the other set embracing the staple shaping members 34. Movement is imparted to said yokes for the purpose of ejecting said staples through the medium of cam ways 43 (see Fig. 11) which are formed in the inner faces of the cam rings 44, which are fixed upon the opposite sides of the staple forming disks, as shown in Figs. 3 and 10. The terminals of said yokes, which lie in radial channels in the sides of the staple forming disks, are provided with the journal pins 45, on which are journaled antifriction rollers 46 which travel in the cam ways 43 of the cam rings. The disposition of the cam rings is such that after the staples have been formed between the peripheries of the staple forming disks a further rotation of said disks will cause the antifriction rollers of the ejecting yokes to ride over the high points 47 (see Fig. 11) in the camways and project the yokes outwardly, as shown in Fig. 8, which operation discharges the formed staples either from the shaping members 34 or from the recess between the jaws 32, accordingly as the staples may remain upon said shaping members or within said jaws as said parts are separated through the rotation of the staple forming disks. The discharged staples drop into a suitable hopper 48 (see Fig. 1) from which they feed onto an inclined distributing track 49. The lower end of the track 49 rests upon a circle bar 50, from which lead a plurality of radial tracks 51 communicating at their lower end with the wire fabric machine, not shown. The track 49 is sufficiently flexible to enable the lower end thereof to be swung in the arc of a circle, as shown by dotted lines in Fig. 3, whereby the formed staples which slide downwardly thereon may be directed onto any one of the radial tracks 51 for the purpose of distributing the staples to their several points of use in the fabric machine.

The journaled boxes 52 and 53, of the shafts 38 and 39 respectively, are held separated by the tension of the coiled springs 54 interposed therebetween, as shown in Fig. 2. Engaging the upper bearing box 53 are the adjusting screws 55 whereby said box may be adjusted so as to properly regulate the space between the staple forming disks. In like manner the slidable boxes 56 and 57 of the shafts 20 and 21 respectively are held separated by the short interposed coil springs 58, as also shown in Fig. 2. Engaging the upper boxes 57 are the adjusting screws 59 whereby said boxes may be adjusted to regulate the space between the peripheries of the cutting disks carried on said shafts 20 and 21. An adjusting screw 60 coöperating with the upper bearing of vertical shaft 6 enables the bending disk 10 to be adjusted with respect to the opposed disk 13 to properly regulate the distance between the coöperating members thereon which serve to place the lateral bends in the strand 14.

It will be noted on referring to Fig. 12 that the operation of the cutting dies when closed upon the strand form partially rounded ends at the terminals of the legs of the staples, which facilitates their entrance into the shaping dies of the fabric machine and relieves said dies from undue wear.

Having thus fully set forth my invention, what I claim as new and desire to secure by Letters Patent, is:—

1. A staple machine comprising means for continuously feeding a strand, means traveling with said strand for forming lateral bends therein from which the staples are made, means for cutting said strand between said lateral bends, and means moving with the strand for forming the bent portions of the strand between said points of cutting into staples having angular legs.

2. A staple machine comprising means for feeding a strand into the machine, means for severing said strand into portions of predetermined lengths, and rotatable staple forming disks having coöperating jaws and shaping members adapted to form the severed portions of the strand into loops as said disks revolve.

3. A staple machine comprising means for feeding a strand into the machine, means for severing said strand into portions of predetermined lengths, rotatable staple forming disks having coöperating jaws and shaping members adapted to form the severed portions of the strand into loops as said disks revolve, and means carried by said disks for discharging the formed staples from the staple forming members.

4. A staple machine comprising means for continuously feeding a strand, means moving with the strand for forming therein opposed lateral bends connected by transversely disposed portions and longitudinally extending portions, means traveling with the strand for cutting the transversely disposed portions of said strand between said bends, and means for engaging the straight longitudinal portions of the strand and forming them into staples the legs of which have angular terminals.

5. A staple machine comprising means for bending a strand laterally to form transversely disposed portions connected by straight longitudinal portions, rotatable cutting disks between which the bent strand passes, dies in said disks for partially severing said strand through the transverse portions thereof, staple forming disks having jaw members, and coöperating shaping members, said shaping members engaging the straight portions of the strand between said lateral bends and forcing them between the jaw members to form them into loops as said disks revolve.

6. A staple machine comprising means for continuously feeding a strand, means for cutting said strand into portions of predetermined lengths, jaw members moving with the strand and coöperating shaping members for forming said severed portions into staples, ejecting yokes for discharging the formed staples, and cam ways for actuating said yokes.

7. A staple machine comprising cutters for partially severing the strand into portions of predetermined lengths and rounding the ends of the partially severed portions, jaw members, and coöperating shaping members for separating said portions at their partially severed points and forming the separated lengths into staples whose legs have rounded ends.

8. A staple machine comprising means for continuously feeding a strand, means for forming lateral bends therein from which the staples are made, means for cutting said strand between the lateral bends, and means for forming the bent portions of the strand between said points of cutting into staples having angular legs.

9. A staple machine comprising means for continuously feeding a strand, means traveling with the strand for forming lateral bends therein from which the staples are made, means for cutting said strand between said lateral bends, and means for forming the bent portions of the strand between said points of cutting into staples having angular legs.

10. A staple machine comprising means for continuously feeding a strand, means for forming lateral bends therein from which the staples are made, means moving with the strand for cutting said strand between the lateral bends, and means for forming the bent portions of the strand between said points of cutting into staples having angular legs.

11. A staple machine comprising means for feeding a strand into the machine, means for severing said strand into portions of predetermined length, and a pair of rotatable staple-forming members, one having a projection and the other a depression which the projection enters as the members rotate, whereby a severed portion of the strand is formed into a loop.

12. A staple machine comprising means for feeding a strand into the machine, means for severing said strand into portions of predetermined length, a pair of rotatable staple-forming members one having a projection and the other a depression which the projection enters as the members rotate, whereby a severed portion of the strand is formed into a loop, and means for imparting rotation to the rotatable members at equal speeds but in opposite directions.

13. A staple machine comprising means for feeding a strand into the machine, means movable in one plane for forming lateral bends in the strand, means for cutting the strand between the lateral bends, and means movable in a plane at an angle to the first-mentioned plane for thereafter bending the intermediate portion of the strand between the points of cutting at an angle to the plane of the lateral bends.

14. A staple machine comprising means for feeding a strand into the machine, rotatable disks for forming lateral bends in the strand, means for cutting the strand between the lateral bends, and rotatable disks mounted in a plane at an angle to the first-mentioned disks for thereafter bending the intermediate portion of the strand between the points of cutting at an angle to the plane of the lateral bends.

15. A staple machine comprising means for feeding a strand into the machine, rotatable disks for forming lateral bends in the strand, rotatable disks for cutting the strand between the lateral bends, said last-mentioned disks being arranged in a plane at right angles to the first-mentioned disks, and rotatable disks mounted in a plane at an angle to the first-mentioned disks for thereafter bending the intermediate portion of the strand between the points of cutting at an angle to the plane of the lateral bends.

16. A staple machine comprising means for feeding a strand into the machine, a pair of rotatable disks for forming lateral bends in the strand, resilient means tending to hold the disks apart, means for adjusting the disks toward each other against the force of the resilient means, means for cutting the strand between the lateral bends, and a pair of rotatable disks mounted in a plane at an angle to the first-mentioned disks for thereafter bending the intermediate portion of the strand between the points of cutting at an angle to the plane of the lateral bends.

17. A staple forming machine comprising means for feeding a strand into the machine, rotatable disks for forming lateral bends in the strand, a pair of rotatable disks for cutting the strand between the lateral bends, resilient means tending to hold the last-mentioned disks apart, means for adjusting the last-mentioned disks toward each other against the force of the resilient means, and rotatable disks mounted in a plane at an angle to the first-mentioned disks for thereafter bending the intermediate portion of the strand between the points of cutting at an angle to the plane of the lateral bends.

In testimony whereof, I sign this specification in the presence of two witnesses.

CLARENCE E. SAFFORD.

Witnesses:
J. OTTO BAENZIGER,
M. E. BROESAMLE.

Copies of this patent may be obtained for five cents each, by addressing the "Commissioner of Patents, Washington, D. C."